United States Patent
Chang et al.

(10) Patent No.: US 9,295,277 B2
(45) Date of Patent: Mar. 29, 2016

(54) SUBSTITUTE FOR FAT WITHIN MEAT AND THE FORMING METHOD THEREOF

(75) Inventors: Hsiang-Wen Chang, Hsinchu (TW); Mung-Jen Tsai, Hsinchu (TW)

(73) Assignee: INDUSTRY RESEARCH & DEVELOPMENT INSTITUTUE, Hsinchu (TW)

( * ) Notice: Subject to any disclaimer, the term of this patent is extended or adjusted under 35 U.S.C. 154(b) by 46 days.

(21) Appl. No.: 13/603,356

(22) Filed: Sep. 4, 2012

(65) Prior Publication Data
US 2013/0171317 A1 Jul. 4, 2013

(30) Foreign Application Priority Data
Dec. 28, 2011 (TW) .............................. 100149111 A

(51) Int. Cl.
| | |
|---|---|
| A23L 1/31 | (2006.01) |
| A23L 1/307 | (2006.01) |
| A23L 1/314 | (2006.01) |
| A23L 1/317 | (2006.01) |
| A23L 1/0522 | (2006.01) |
| A23L 1/05 | (2006.01) |

(52) U.S. Cl.
CPC .............. *A23L 1/307* (2013.01); *A23L 1/0522* (2013.01); *A23L 1/3177* (2013.01); *A23L 1/31418* (2013.01); *A23L 1/05* (2013.01)

(58) Field of Classification Search
CPC ....... A23L 1/05; A23L 1/0522; A23L 1/0532; A23L 1/307; A23L 1/31418; A23L 1/3177
USPC ......................................................... 426/574
See application file for complete search history.

(56) References Cited

U.S. PATENT DOCUMENTS

| | | | |
|---|---|---|---|
| 5,232,722 A * | 8/1993 | Obara et al. ................. | 426/104 |
| 5,380,542 A | 1/1995 | Jenkins et al. | |
| 5,409,726 A | 4/1995 | Stanley et al. | |
| 5,603,976 A | 2/1997 | Share et al. | |
| 5,688,775 A * | 11/1997 | Renn et al. ...................... | 514/54 |

FOREIGN PATENT DOCUMENTS

| | | |
|---|---|---|
| EP | 0 501 758 | 3/1999 |
| JP | 2003204772 | 7/2003 |

OTHER PUBLICATIONS

Fat RepLacers in Meat Products by Ozlem Tokusoglu, source Pakistan Journal of Nulrffion 2 (3): 198-203, 2003 Asian Network for Scientific Information 2003, pp. 196.*

I YiLMAZ et al., "Fatty acid ~;mposition and quality characteristics of tow-fat cooked sausages made with beef and chicken meat tomato juice and sunf}ower :oil"; Meat Science, vol. 62, No. 2, I Oct. 2002, pp. 253-258.*

Ma. Luruena-Martinez etal., ':'Effect of locust bean/zanthan gum add}tion and replacement of pork fat with ol:ive oil on the quality characteristics of low-fat frankfurters; Meat Science, vol. 68. No. 3, Nov. 1, 2004, pp. 383-389.*

Warner K. et al.. "Use of starch-lipid compos!tes in low-fat ground beef predicts": Food Technology, vol. 55, Feb. 1, 2001,pp. 36-41.*

Igoe et al., Dictinary of Food Ingredients (4$^{th}$ edition), springer verlag, 2001, pp. 31, 42 and 84.*

English language translation of abstract of JP 2003204772 (published Jul. 22, 2003).

* cited by examiner

*Primary Examiner* — Jyoti Chawla
(74) *Attorney, Agent, or Firm* — McClure, Qualey & Rodack, LLP

(57) ABSTRACT

The invention provides a meat-fat substitute, the forming composition thereof including: at least one edible gum; at least one starch; and water, wherein the at least one edible gum is present in an amount of about 0.5-20 parts by weight, the at least one starch is present in an amount of about 0.5-10 parts by weight and the water is present in an amount of about 60-99 parts by weight.

20 Claims, 1 Drawing Sheet

SUBSTITUTE FOR FAT WITHIN MEAT AND THE FORMING METHOD THEREOF

CROSS REFERENCE TO RELATED APPLICATIONS

This Application claims priority of Taiwan Patent Application No. 100149111, filed on Dec. 28, 2011, the entirety of which is incorporated by reference herein.

BACKGROUND OF THE INVENTION

1. Field of the Invention

The present invention relates to a meat-fat substitute, and in particular relates to a meat-fat substitute having low calories, and the appearance and taste/texture of original fat, wherein the meat-fat substitute is thermo-irreversible.

2. Description of the Related Art

Clinical research verifies that fat, saturated fatty acid, cholesterol, etc. in one's diet relates to weight gain, type II diabetes, cardiovascular disease and some cancers. The World Health Organization (WHO) suggests that the daily dietary intake of fat should be present in the amount of 15-30% of total caloric intake, wherein saturated fatty acid should not be more than 10%, trans fatty acid should be lower than 1%, and cholesterol should be lower than 300 mg. However, the fat content of common meat products are generally between 20-50%.

In order to solve the problem of excess fat contained in meat products, there have been many technologies related to the formation of a low-fat meat product.

U.S. Pat. No. 5,603,973 discloses that one or more dextrin (glucose equivalent of each is less than 20) are embedded in sodium alginate, gum, pectin or a konjac gel matrix to manufacture an animal fat substitute. However, an initial step for mixing each raw material mentioned above needs to be performed at 73-95.

JP Patent Publication No. 2003-204772 discloses that colloid particles composed of water, fat, collagen hydrolyte and a polysaccharide thickener are mixed with a sausage composition, and then mixed with konjac gel to improve the chewing texture for low-fat sausages.

However, the above mentioned technologies have the problems of minute and complicated forming process and/or not low enough fat content for products, and shape change at high temperatures. Therefore, a novel substitute for the fat found within meat is needed, wherein the meat-fat substitute has the advantages of a simple process, low calories, low fat and shape consistency at high-temperature cooking.

BRIEF SUMMARY OF THE INVENTION

The invention provides a meat-fat substitute, the forming composition thereof comprising: at least one edible gum; at least one starch; and water, wherein the at least one edible gum is present in an amount of about 0.5-20 parts by weight, the at least one starch is present in an amount of about 0.5-10 parts by weight and the water is present in an amount of about 60-99 parts by weight.

The invention further provides a method for forming a meat-fat substitute, comprising: (a) mixing at least one edible gum, at least one starch and water to form a mixture, wherein the at least one edible gum is present in an amount of about 0.5-20 parts by weight, the at least one starch is present in an amount of about 0.5-10 parts by weight and the water is present in an amount of about 60-99 parts by weight; and (b) heating the mixture to clot the mixture to form a meat-fat substitute.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
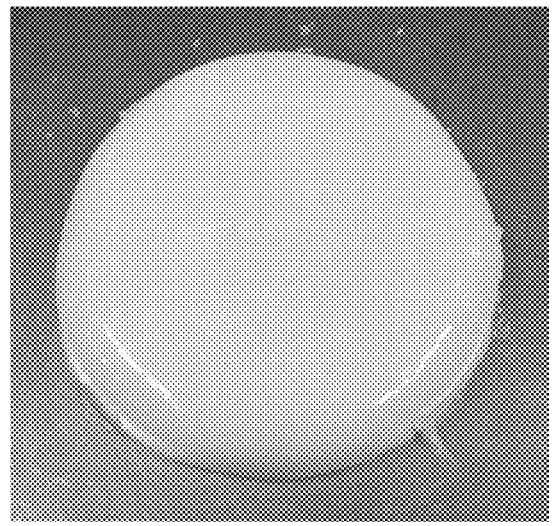
FIG. 1 shows the appearance of the product of Example 1-1.

The following description is of the best-contemplated mode of carrying out the invention. This description is made for the purpose of illustrating the general principles of the invention and should not be taken in a limiting sense. The scope of the invention is best determined by reference to the appended claims.

In one aspect of the present invention, the present invention provides a meat-fat substitute. The "meat-fat substitute" mentioned herein is able to be generally called "fat meat". In addition to having the appearance and texture of the original fat, the meat-fat substitute provided by the present invention has the advantages of low calories and low fat.

In one embodiment, a forming composition for the meat-fat substitute mentioned above may comprise, but is not limited to, at least one edible gum, at least one starch and water. In the forming composition mentioned above, the at least one edible gum may be present in an amount of about 0.5-20 parts by weight, the at least one starch may be present in an amount of about 0.5-10 parts by weight and the water may be present in an amount of about 60-99 parts by weight.

The at least one edible gum may comprise curdlan, locust bean gum, carrageenan, gellan gum, xanthan gum, guar gum, gelatin, sodium alginate or the combination thereof, but is not limited thereto. In one embodiment, the at least one edible gum consists of curdlan and locust bean gum. Curdlan is a polysaccharide polymer composed of (1→3)-β-glucan. β-glucan is considered to be a substance that is not easy to digest; a cellulose which is not easily metabolized by the digestive tract and hard to dissolve, and thus will not produce calories. Accordingly, curdlan can be applied to dietary calorie control and control of obesity. In addition, locust bean gum derives from locust bean pods. The locust bean pods are subjected to a pulverizing process, the beans removed and then subjected to a heating process, and locust bean gum is obtained accordingly. Locust bean gum, a tasteless, white powder, is a polysaccharide formed by galactose bonding to mannoside, and the molecular weight thereof is about 300,000 Daltons. Locust bean gum is an excellent thickener and stabilizer. Dried locust bean gum is capable of absorbing 50 times its weight in water, and dried locust bean gum dispersed in cold water and heated is capable of becoming a uniform, transparent solution. Locust bean gum is able to cause a synergistic effect with other natural gum, and that substantially enhances its properties of viscosity and gel formation.

Meanwhile, suitable examples for starch may comprise, but are not limited to, potato starch, corn starch, indica rice flour, glutinous rice flour, pea flour, modified starch and the combination thereof. The foregoing modified starch may comprise waxy corn starch, pregelatinized cassava starch, cassava starch, etc. In the forming composition mentioned above, the starch may be used as a bulking agent. In one embodiment, the starch may be potato starch.

In another embodiment, in addition to the at least one edible gum, the at least one starch, and the water mentioned above, the forming composition of the meat-fat substitute of the present invention may further comprise at least one food dispersant, wherein the at least one food dispersant may be present in an amount of about 0.5-10 parts by weight. Examples of the food dispersant may be carbohydrate powders which are tasteless or have a low sweetness, and are capable of quickly dissolving, comprising glucose, lactose, maltodextrin, etc. and the combination thereof, but is not limited thereto. In one embodiment, the food dispersant may be lactose.

In further another embodiment, in addition to the at least one edible gum, the at least one starch and the water mentioned above, the forming composition of the meat-fat substitute of the present invention may further comprise a vegetable oil, wherein the vegetable oil may be present in an amount of about 0.5-10 parts by weight. The foregoing vegetable oil may comprise soybean oil, sunflower oil, canola oil, olive oil, grape seed oil or peanut oil, but is not limited thereto.

Furthermore, in another embodiment, in addition to the at least one edible gum, the at least one starch and the water mentioned above, the forming composition of the substitute for fat within meat of the present invention may further comprise at least one food dispersant and a vegetable oil, wherein the at least one food dispersant may be present in an amount of about 0.5-10 parts by weight and the vegetable oil may be present in an amount of about 0.5-10 parts by weight. Examples of the food dispersant and the vegetable oil are described as mentioned above. In this embodiment, the at least one edible gum consists of curdlan and locust bean gum, the at least one starch is potato starch, the at least one food dispersant is lactose, and the vegetable oil is sunflower oil, wherein the curdlan and the locust bean gum may be present in an amount of about 2-15 parts by weight, the potato starch may be present in an amount of about 0.5-10 parts by weight, the water may be present in an amount of about 75-90 parts by weight, the lactose may be present in an amount of about 0.5-5 parts by weight, and the vegetable oil may be present in an amount of about 0.5-10 parts by weight.

Moreover, in one embodiment, the forming composition of the meat-fat substitute of the present invention may not contain any oil.

The fat content of the meat-fat substitute provided by the present invention may be only 0-5 wt %, preferably 0-1 wt %. In an embodiment which does not contain any oil, the fat content of the meat-fat substitute provided by the present invention may be 0 wt %.

In addition, the caloric value of the meat-fat substitute provided by the present invention is only about 10-72 kcal/100 g, and that is only 1.1-8.2% of pork back fat whose caloric value is about 880 kcal/100 g.

In another aspect of the present invention, the present invention provides a method for forming a meat-fat substitute, which is capable of forming the meat-fat substitute of the present invention mentioned above. The above-mentioned method may comprise the following steps, but is not limited thereto.

First, at least one edible gum, at least one starch, and water are mixed to form a mixture, wherein the at least one edible gum is present in an amount of about 0.5-20 parts by weight, the at least one starch is present in an amount of about 0.5-10 parts by weight and the water is present in an amount of about 60-99 parts by weight. In one embodiment, the foregoing mixing step is performed at room temperature.

The at least one edible gum may comprise curdlan, locust bean gum, carrageenan, gellan gum, xanthan gum, guar gum, gelatin, sodium alginate or the combination thereof, but is not limited thereto. In one embodiment, the at least one edible gum consists of curdlan and locust bean gum.

Suitable examples for starch may comprise, but are not limited to, potato starch, corn starch, indica rice flour, glutinous rice flour, pea flour, modified starch and the combination thereof. The foregoing modified starch may comprise waxy corn starch, pregelatinized cassava starch, cassava starch, etc. In the forming composition mentioned above, the starch may be used as a bulking agent. In one embodiment, the starch may be potato starch.

Furthermore, in another embodiment, in the method of the present invention, the mixing step may further mix at least one food dispersant with the at least one edible gum, the at least one starch, and the water to form the foregoing mixture. The at least one food dispersant may be present in an amount of about 0.5-10 parts by weight. Examples of the food dispersant may be carbohydrate powders which are tasteless or with low sweetness, and are capable of quickly dissolving, comprising glucose, lactose and maltodextrin, etc. and the combination thereof, but is not limited thereto. In one embodiment, the food dispersant may be lactose.

In further another embodiment, in the method of the present invention, the mixing step may further mix a vegetable oil with the at least one edible gum, the at least one starch, and the water to form the foregoing mixture. The vegetable oil may be present in an amount of about 0.5-10 parts by weight. The foregoing vegetable oil may comprise soybean oil, sunflower oil, canola oil, olive oil, grape seed oil or peanut oil, but is not limited thereto. In one embodiment, the vegetable oil is sunflower oil.

In addition, in another embodiment, in the method of the present invention, the mixing step may further mix at least one food dispersant and a vegetable oil with the at least one edible gum, the at least one starch, and the water to form the foregoing mixture. The at least one food dispersant may be present in an amount of about 0.5-10 parts by weight, and the vegetable oil may be present in an amount of about 0.5-10 parts by weight. Examples of the food dispersant and the vegetable oil are described as mentioned above, respectively.

Next, the mixture is heated to clot to form the meat-fat substitute of the present invention. A temperature for heating may be about 50-120, and time for heating may be about 30 seconds to 60 minutes. Meanwhile, a manner for heating may comprise, but is not limited to, steaming, roasting, or microwaving. In one embodiment, conditions for microwaving are 2.45 GHz for about 30 seconds to 10 minutes.

In addition, after the heating step mentioned above, the formed meat-fat substitute may further be cooled to be convenient for preserving.

A time for cooling may be about 1-60 minutes, and a manner for cooling may comprise room temperature cooling, low-temperature cooling or vacuum cooling, but is not limited thereto. A temperature for low-temperature cooling is about 0-5. In one embodiment, room temperature cooling is performed for about 10-60 minutes. In another embodiment, low-temperature cooling (5) is performed for about 1-30 minutes. In yet another embodiment, vacuum cooling is performed for about 1-30 minutes.

In addition to having the appearance and texture of original fat, the meat-fat substitute formed by the method of the present invention has the advantages of low calories and low fat content. Moreover, the meat-fat substitute formed by the method of the present invention is thermo-irreversible. Therefore, even if the meat-fat substitute formed by the method of the present invention is reheated, it will not recover to the liquid mixture. Accordingly, the meat-fat substitute formed by the method of the present invention is suitable for applying to various manners of cooking.

EXAMPLES

1. Formula and Preparation for Meat-Fat Substitute

Figure 2:
FIG. 2 shows the appearance of the product of Example 6-1.

According to the formula of each example of the present invention shown in Table 1 to Table 7, mixtures are respectively formed, heated at 95 for 10 minutes, and then cooled at room temperature to form the meat-fat substitute of each example. The added amount of each ingredient shown in Table 2 to Table 7 is for per 100 g of water. The meat-fat substitute formed by Example 1-1 is shown as FIG. 1, and the meat-fat substitute formed by Example 6-1 is shown as FIG. 2.

TABLE 1

Formulas for meat-fat substitutes of Example 1-1 to Example 1-3 and descriptions for the products thereof

| Ingredient | Example 1-1 | Example 1-2 | Example 1-3 |
|---|---|---|---|
| Curdlan (g) | 18 | 24 | 30 |
| Locust bean gum (g) | 1.5 | 1.5 | 1.5 |
| Lactose (g) | 12 | 12 | 12 |
| Potato starch (g) | 3 | 3 | 3 |
| Sunflower oil (g) | 25 | 25 | 25 |
| Water (g) | 300 | 300 | 300 |
| Calories (kcal/100 g) | 72 | 71 | 70 |
| Description for the product | Appearance: ⊚ Color: ⊚ Texture: ⊚ | Appearance: ⊚ Color: ⊚ Texture: ○ | Appearance: ⊚ Color: ⊚ Texture: Δ |

⊚: Excellent;
○: Good;
Δ: Acceptable;
X: Bad

TABLE 2

Formulas for meat-fat substitutes of Example 2-1 to Example 2-2 and descriptions for the products thereof

| | Ingredient | Weight (g) | Description for the product |
|---|---|---|---|
| Example 2-1 | Curdlan | 12 | Appearance: Δ |
| | Sodium alginate | 2 | Color: X |
| | Potato starch | 2 | Texture: Δ |
| | Calcium lactate | 1 | |
| Example 2-2 | Curdlan | 2 | Appearance: Δ |
| | Sodium alginate | 10 | Color: X |
| | Potato starch | 3 | Texture: Δ |
| | Calcium lactate | 1 | |

⊚: Excellent;
○: Good;
Δ: Acceptable;
X: Bad

TABLE 3

Formulas for meat-fat substitutes of Example 3-1 to Example 3-4 and descriptions for the products thereof

| | Ingredient | Weight (g) | Description for the product |
|---|---|---|---|
| Example 3-1 | Curdlan | 2 | Appearance: Δ |
| | Sodium alginate | 8 | Color: X |
| | Corn starch | 6 | Texture: Δ |
| | Calcium lactate | 0.2 | |
| Example 3-2 | Curdlan | 3 | Appearance: Δ |
| | Sodium alginate | 5 | Color: X |
| | Waxy corn starch | 8 | Texture: Δ |
| | Calcium lactate | 0.2 | |
| Example 3-3 | Curdlan | 8 | Appearance: Δ |
| | Sodium alginate | 4 | Color: X |
| | Carboxymethyl cellulose | 2.5 | Texture: Δ |
| | Calcium lactate | 0.5 | |
| Example 3-4 | Curdlan | 5 | Appearance: Δ |
| | Sodium alginate | 1 | Color: Δ |
| | Xanthan gum | 0.5 | Texture: X |
| | Lactose | 5 | |
| | Corn starch | 4 | |
| | Calcium lactate | 0.5 | |

⊚: Excellent;
○: Good;
Δ: Acceptable;
X: Bad

TABLE 4

Formulas for meat-fat substitutes of Example 4-1 to Example 4-3 and descriptions for the products thereof

| | Ingredient | Weight (g) | Description for the product |
|---|---|---|---|
| Example 4-1 | Curdlan | 3 | Appearance: X |
| | Sodium alginate | 6 | Color: X |
| | Lactose | 2 | Texture: X |
| | Maltodextrin | 2 | |
| | Glutinous rice flour | 3 | |
| | Calcium lactate | 0.5 | |
| Example 4-2 | Curdlan | 10 | Appearance: Δ |
| | Lactose | 2 | Color: Δ |
| | Maltodextrin | 1 | Texture: ○ |
| | Corn starch | 3 | |
| Example 4-3 | Curdlan | 11 | Appearance: Δ |
| | Sodium alginate | 0.5 | Color: ○ |
| | Lactose | 2 | Texture: ⊚ |
| | Maltodextrin | 0.5 | |
| | Corn starch | 3 | |
| | Calcium lactate | 0.2 | |

⊚: Excellent;
○: Good;
Δ: Acceptable;
X: Bad

TABLE 5

Formulas for meat-fat substitutes of Example 5-1 to Example 5-7 and descriptions for the products thereof

| | Ingredient | Weight (g) | Description for the product |
|---|---|---|---|
| Example 5-1 | Curdlan | 10 | Appearance: Δ |
| | Sodium alginate | 0.5 | Color: Δ |
| | Lactose | 2 | Texture: ○ |
| | Pregelatinized cassava starch | 3 | |
| | Calcium lactate | 0.2 | |
| Example 5-2 | Curdlan | 10 | Appearance: Δ |
| | Sodium alginate | 0.25 | Color: Δ |

TABLE 5-continued

Formulas for meat-fat substitutes of Example 5-1 to Example 5-7 and descriptions for the products thereof

|  | Ingredient | Weight (g) | Description for the product |
|---|---|---|---|
|  | Lactose | 2.7 | Texture: ○ |
|  | Pregelatinized cassava starch | 3 |  |
|  | Calcium lactate | 0.05 |  |
| Example 5-3 | Curdlan | 10 | Appearance: Δ |
|  | Pregelatinized cassava starch | 3 | Color: X |
|  | Cassava starch | 3 | Texture: ○ |
| Example 5-4 | Curdlan | 10 | Appearance: Δ |
|  | Lactose | 2 | Color: ○ |
|  | Indica rice flour | 4 | Texture: Δ |
| Example 5-5 | Curdlan | 10 | Appearance: X |
|  | Lactose | 4 | Color: ○ |
|  | Maltodextrin | 0.5 | Moderate level of texture: Δ |
|  | Corn starch | 2 |  |
| Example 5-6 | Curdlan | 11 | Appearance: Δ |
|  | Sodium alginate | 0.25 | Color: ○ |
|  | Lactose | 3 | Texture: ○ |
|  | Corn starch | 2.72 |  |
|  | Calcium lactate | 0.02 |  |
| Example 5-7 | Curdlan | 11 | Appearance: Δ |
|  | Sodium alginate | 0.5 | Color: Δ |
|  | Lactose | 4 | Texture: ○ |
|  | Corn starch | 1 |  |
|  | Calcium lactate | 0.02 |  |

◎: Excellent;
○: Good;
Δ: Acceptable;
X: Bad

TABLE 6

Formulas for meat-fat substitutes of Example 6-1 to Example 6-5 and descriptions for the products thereof

|  | Ingredient | Weight (g) | Description for the product |
|---|---|---|---|
| Example 6-1 | Curdlan | 10 | Appearance: ◎ |
|  | Locust bean gum | 0.5 | Color: ◎ |
|  | Lactose | 4 | Texture: ◎ |
|  | Corn starch | 2 |  |
| Example 6-2 | Curdlan | 12 | Appearance: ○ |
|  | Locust bean gum | 0.5 | Color: ○ |
|  | Lactose | 2 | Texture: Δ |
|  | Corn starch | 2 |  |
| Example 6-3 | Curdlan | 9 | Appearance: Δ |
|  | Locust bean gum | 1 | Color: Δ |
|  | Lactose | 4 | Texture: Δ |
|  | Pea flour | 2 |  |
| Example 6-4 | Curdlan | 10 | Appearance: ○ |
|  | Locust bean gum | 2 | Color: ○ |
|  | Lactose | 1 | Texture: ○ |
|  | Corn starch | 3 |  |
| Example 6-5 | Curdlan | 10 | Appearance: Δ |
|  | Locust bean gum | 1 | Color: Δ |
|  | Carrageenan | 1 | Texture: Δ |
|  | Lactose | 2 |  |
|  | Corn starch | 2 |  |
|  | Potassium chloride | 0.5 |  |

◎: Excellent;
○: Good;
Δ: Acceptable;
X: Bad

TABLE 7

Formulas for meat-fat substitutes of Example 7-1 to Example 7-6 and description for the products thereof

|  | Ingredient | Weight (g) | Description for the product |
|---|---|---|---|
| Example 7-1 | Curdlan | 10 | Appearance: Δ |
|  | Carrageenan | 1 | Color: ○ |
|  | Lactose | 3.5 | Texture: X |
|  | Corn starch | 1.5 |  |
|  | Potassium chloride | 0.1 |  |
| Example 7-2 | Curdlan | 10 | Appearance: Δ |
|  | Carrageenan | 1 | Color: Δ |
|  | Gellan gum | 0.5 | Texture: X |
|  | Lactose | 2.5 |  |
|  | Corn starch | 2 |  |
|  | Potassium chloride | 0.1 |  |
| Example 7-3 | Curdlan | 8 | Appearance: Δ |
|  | Carrageenan | 1 | Color: Δ |
|  | Gellan gum | 0.5 | Texture: X |
|  | Locust bean gum | 1 |  |
|  | Lactose | 4 |  |
|  | Corn starch | 2 |  |
|  | Potassium chloride | 0.1 |  |
| Example 7-4 | Curdlan | 8 | Appearance: Δ |
|  | Carrageenan | 1 | Color: Δ |
|  | Gellan gum | 0.5 | Texture: X |
|  | Locust bean gum | 1 |  |
|  | Lactose | 4 |  |
|  | Corn starch | 2 |  |
|  | Potassium chloride | 0.2 |  |
| Example 7-5 | Curdlan | 10 | Appearance: Δ |
|  | Carrageenan | 1 | Color: Δ |
|  | Gellan gum | 0.5 | Texture: X |
|  | Locust bean gum | 1 |  |
|  | Lactose | 1.5 |  |
|  | Corn starch | 2 |  |
|  | Potassium chloride | 0.1 |  |
| Example 7-6 | Curdlan | 10 | Appearance: Δ |
|  | Gellan gum | 0.5 | Color: Δ |
|  | Locust bean gum | 0.5 | Texture: Δ |
|  | Lactose | 3 |  |
|  | Corn starch | 2 |  |

◎: Excellent;
○: Good;
Δ: Acceptable;
X: Bad

2. Formula and Preparation of Minced Pork Sauce

According to each formula shown in Table 8, different minced pork sauce products were formulated. The minced pork sauce product formed by Formula C containing fat meat was considered as a control group.

TABLE 8

Formulas of minced pork sauce products

|  | Formula C (Control) | Formula I | Formula II | Formula III |
|---|---|---|---|---|
| Minced pork ham | 1000 | 1000 | 1000 | 1000 |
| Fat Meat | 400 | — | — | — |
| Example 1-1 | — | 400 | — | — |
| Example 1-2 | — | — | 400 | — |
| Example 1-3 | — | — | — | 400 |
| Soya sauce | 160 | 160 | 160 | 160 |
| Five spices powder | 8 | 8 | 8 | 8 |
| Crisp shallot | 80 | 80 | 80 | 80 |

TABLE 8-continued

Formulas of minced pork sauce products

| | Formula C (Control) | Formula I | Formula II | Formula III |
|---|---|---|---|---|
| Rice liqueur | 32 | 32 | 32 | 32 |
| Water | 880 | 880 | 880 | 880 |
| Calories (kcal/100 g) | 208 | 80 | 80 | 80 |

—: no addition

3. Sensory Evaluation Analysis for Minced Pork Sauce Products

A sensory evaluation analysis was performed to the minced pork sauce products formed by control group (containing fat meat), Formula I, Formula II and Formula III, respectively, by 31 sensory panels. A 9-point scoring system was adopted, with the higher score representing greater preference. The results are shown in Table 9.

TABLE 9

Sensory Evaluation analysis for minced pork sauce products

| Item | Control group | Formula I | Formula II | Formula III |
|---|---|---|---|---|
| Appearance | $6.7 \pm 1.4^a$ | $6.7 \pm 1.1^a$ | $6.4 \pm 1.4^a$ | $6.4 \pm 1.4^a$ |
| Flavor | $6.7 \pm 1.2^a$ | $6.1 \pm 1.5^b$ | $6.0 \pm 1.1^b$ | $5.8 \pm 1.3^b$ |
| Taste texture | $6.6 \pm 1.3^a$ | $6.1 \pm 1.6^a$ | $5.9 \pm 1.6^a$ | $5.8 \pm 1.5^a$ |
| Over all | $6.8 \pm 1.2^a$ | $6 \pm 1.6^b$ | $6.0 \pm 1.3^b$ | $6 \pm 1.1^b$ |

$^a$The value shown in the item has no significant difference from that of control group ($p > 0.05$);
$^b$The value shown in the item has significant difference from that of control group ($p < 0.05$).

According to Table 9, it is known that the minced pork sauce products containing the meat-fat substitutes for of Example 1-1, 1-2, 1-3, respectively do not exhibit a significant difference from the control group in appearance and texture ($p>0.05$), and only differ significantly from the control group in flavor and overall preference ($p<0.05$). Therefore, according to the above results, the meat-fat substitutes of the examples of the present invention indeed approximate the appearance and taste/texture of the fat found within meat.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A meat-fat substitute, the forming composition thereof comprising:
    a combination of curdlan and locust bean gum;
    at least one starch;
    lactose; and
    water,
    wherein the combination of curdlan and locust bean gum is present in an amount of 0.5-20 parts by weight, the at least one starch is present in an amount of 0.5-10 parts by weight, the lactose is present in an amount of 0.5-5 parts by weight and the water is present in an amount of 60-99 parts by weight, and
    wherein the meat-fat substitute is thermo-irreversible and the fat content of the meat-fat substitute is 0-5 wt %.

2. The meat-fat substitute as claimed in claim 1, wherein the at least one starch comprises potato starch, corn starch, indica rice flour, glutinous rice flour, pea flour, modified starch or the combination thereof.

3. The meat-fat substitute as claimed in claim 2, wherein the modified starch comprises waxy corn starch, pregelatinized cassava starch, or cassava starch.

4. The meat-fat substitute as claimed in claim 1, further comprising a vegetable oil.

5. The meat-fat substitute as claimed in claim 4, wherein the vegetable oil comprises soybean oil, sunflower oil, canola oil, olive oil, grape seed oil, or peanut oil.

6. The meat-fat substitute as claimed in claim 1, further comprising at least one food dispersant and a vegetable oil.

7. The meat-fat substitute as claimed in claim 6, wherein the at least one starch is potato starch, and the vegetable oil is sunflower oil.

8. A method for forming a meat-fat substitute as claimed in claim 1, comprising:
    (a) mixing the combination of curdlan and locust bean gum, at least one starch and water to form a mixture, wherein the combination of curdlan and locust bean gum is present in an amount of 0.5-20 parts by weight, the at least one starch is present in an amount of about 0.5-10 parts by weight and the water is present in an amount of 60-99 parts by weight; and
    (b) heating the mixture to clot the mixture to form a meat-fat substitute.

9. The method for forming a meat-fat substitute as claimed in claim 8, wherein the at least one starch comprises potato starch, corn starch, indica rice flour, glutinous rice flour, pea flour, modified starch or the combination thereof.

10. The method for forming a meat-fat substitute as claimed in claim 8, wherein in step (a) further includes mixing at least one food dispersant with the combination of curdlan and locust bean gum, the at least one starch and the water to form the mixture.

11. The method for forming a meat-fat substitute as claimed in claim 10, wherein the at least one food dispersant is present in an amount of 0.5-10 parts by weight.

12. The method for forming a meat-fat substitute as claimed in claim 10, wherein the at least one food dispersant comprises glucose, lactose, maltodextrin or the combination thereof.

13. The method for forming a meat-fat substitute as claimed in claim 8, wherein in step (a) further includes mixing a vegetable oil with the combination of curdlan and locust bean gum, the at least one starch, and the water to form the mixture.

14. The method for forming a meat-fat substitute as claimed in claim 13, wherein the vegetable oil is present in an amount of 0.5-10 parts by weight.

15. The method for forming a meat-fat substitute as claimed in claim 13, wherein the vegetable oil comprises soybean oil, sunflower oil, canola oil, olive oil, grape seed oil, or peanut oil.

16. The method for forming a meat-fat substitute as claimed in claim 8, wherein in step (a) further includes mixing at least one food dispersant and a vegetable oil with the combination of curdlan and locust bean gum, the at least one starch, and the water to form the mixture.

17. The method for forming a meat-fat substitute as claimed in claim 16, wherein the at least one food dispersant is present in an amount of 0.5-10 parts by weight, and the vegetable oil is present in an amount of 0.5-10 parts by weight.

18. The method for forming a meat-fat substitute as claimed in claim 8, wherein in step (b), the temperature for heating is 50-120° C., and the time for heating is 30 seconds to 60 minutes.

19. The method for forming a meat-fat substitute as claimed in claim 8, after step (b), further comprising (c) cooling the meat-fat substitute.

20. The method for forming a meat-fat substitute as claimed in claim 19, wherein the manner of cooling in step (c) is room-temperature cooling, low-temperature cooling, or vacuum cooling.

* * * * *